May 20, 1952  N. C. REMICH  2,597,129
GEAR CHAMFERING HOB
Filed April 17, 1947  2 SHEETS—SHEET 1
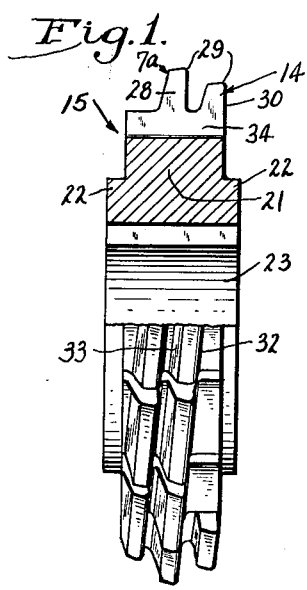
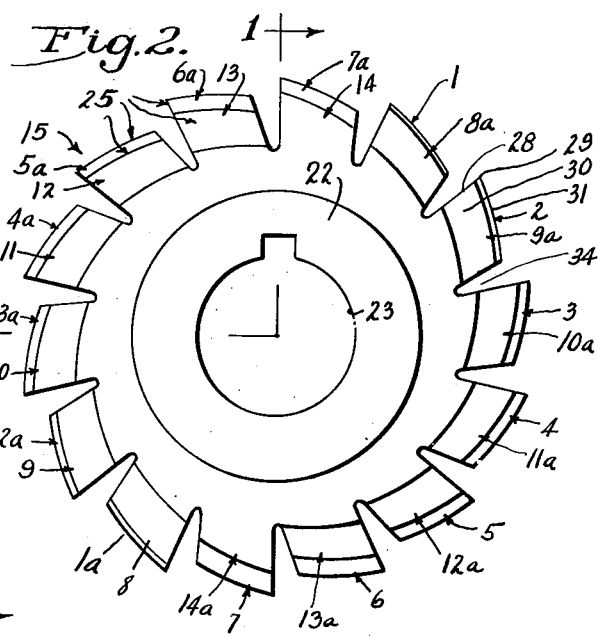
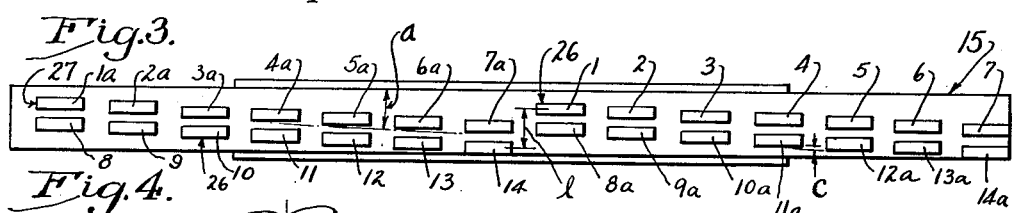
INVENTOR.
Norman C. Remich
BY
Carlson, Pitney, Hubbard & Wolfe
ATTORNEYS INVENTOR
Norman C. Remich
BY
Carlson, Pitzner, Hubbard & Wolfe
ATTORNEYS Patented May 20, 1952

2,597,129

UNITED STATES PATENT OFFICE 2,597,129

GEAR CHAMFERING HOB

Norman C. Remich, Rockford, Ill., assignor to Barber-Colman Company, Rockford, Ill., a corporation of Illinois Application April 17, 1947, Serial No. 741,989

2 Claims. (Cl. 29—103)

The present invention relates to improvements in gear chamfering hobs.

A general object of the invention is to provide a chamfering hob which has a smooth and continuous cutting action, and in which the cutting load is uniformly distributed over a considerably larger number of teeth than in prior hobs of the same type, thereby prolonging the hob life and improving the surface finish on the work.

Another object is to provide a gear chamfering hob having plural rows of teeth for chamfering a corresponding number of gear teeth during each hob revolution, with the hob teeth so formed and arranged that the cutting action is not interrupted, but progresses uniformly, with a full convolution of cutting increments throughout each revolution, thereby preventing chatter and vibration.

A further object is to provide a hob of the foregoing character which, after the initial infeed to depth, is capable of completely chamfering all of the gear teeth in one revolution of the gear.

Other objects and advantages will become apparent as the description proceeds.

In the accompanying drawings,

Figure 1 is a view, partially in front elevation, and partially in axial section along the line 1—1 of Fig. 2, of a chamfering hob embodying the features of the present invention.

Fig. 2 is a right end view of the hob.

Fig. 3 is a diagrammatic plan development of the periphery of the hob.

Fig. 4 is a schematic plan view showing the hob and a gear in cutting relation.

Fig. 5 is a view of the hob and gear of Fig. 4 taken in a direction axially of the gear.

Fig. 6 is an elevational view of the hob and gear of Fig. 4 taken toward one side edge of the gear.

Fig. 7 is a perspective view of an upper fragment of a chamfered gear.

Figure 8:
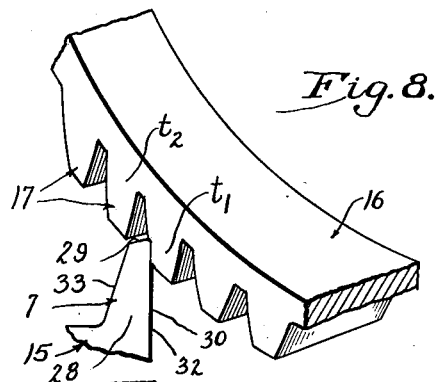
Figs. 8 to 11 are fragmentary perspective views taken in a direction normal to the face of the emerging hob tooth, and illustrating progressive steps in the chamfering of the gear teeth.

Referring more particularly to the drawings, the hob, identified generally at 15, and constituting the exemplary embodiment of the present invention, is adapted for the chamfering of the ends of the teeth of various types of gears. The hob is commonly used and especially adapted for chamfering external ring gears 16 with peripherally spaced teeth 17 having a circular pitch P, as illustrated in Figs. 4 to 7. Customarily, one side edge portion at one end of either tooth flank, as indicated by the chamfered surface 18, is removed in the hobbing operation. It will be evident that each chamfered surface 18 is inclined to the longitudinal center line of the associated gear tooth 17, and leaves a narrow land 19 at one longitudinal end of the tooth. The chamfer is commonly provided to facilitate smooth and ready meshing engagement through relative axial movement of the gear 16 and a mating pinion (not shown). Therefore, in order to prevent the clashing of gear teeth, it is desirable that the land 19 of each tooth 17 be narrow and of substantially uniform width. In fact, except for the slight involute curvature of the unchamfered edge, the side edges of each land 19 preferably are approximately parallel. The chamfered surface 18 extends the full height of the tooth 17 and inwardly of the base circle, and, as to shape, may have any desired configuration, but preferably is flat or substantially so in order to obtain smooth interengagement between the gear 16 and pinion. Thus, the particular form and inclination of the chamfered surface 18 serves to effect both maximum efficiency in use and attractiveness in appearance. It will be understood that in the hobbing operation, the gear 16 would be supported for rotary drive on a supporting shaft or arbor 20.

The hob 15, in the preferred form shown, comprises a generally cylindrical body 21 having a central hub 22 formed with an axial bore 23 for the reception of a rotary supporting shaft or arbor 24 adapted to be driven in suitably timed relation to the shaft 20.

Formed on the outer periphery of the body are multiple spiral rows or convolutions of cutting teeth indicated collectively as 25. The multiple rows of teeth are arranged to start at peripherally spaced points about and in a common transaxial plane of the hob body 21. In the present instance, two rows or threads 26 and 27 of teeth are provided, and they start preferably at diametrically opposite, and hence equally spaced, points about the circumference, or substantially so.

The parallel helical threads or tooth rows 26 and 27 are alike in spiral lead and tooth construction. Each thread has a constant lead angle $a$ and a total lead $l$ per convolution in a direction along the hob axis. The pitch of the hob teeth is considerably shorter than that of the gear teeth, and is also shorter than that of the teeth in prior chamfering hobs. While not restricted to any definite number of teeth, each thread is shown comprising fourteen uniformly spaced teeth, those of the thread 26 being identified progressively as 1 to 14, and those of the thread 27 being correspondingly identified as 1a to 14a.

The multiple tooth rows or threads are provided to permit the chamfering of more than one gear tooth 17 in the course of each hob revolution, and are started at uniformly peripherally spaced points so to render the rows successively effective over different portions of the revolution. Thus, the double thread hob of the present invention will completely chamfer two contiguous gear teeth 17 in each revolution, the first thread 26 cutting one gear tooth during the first half revolution, and the second thread 27 cutting the next gear tooth during the second half revolution.

The teeth 25 of the two rows or threads 26 and 27 all have the same effective cutting contour. Thus, each tooth 25 has a straight radial face 28 which defines a cutting contour comprising a top edge 29 and a side edge 30, and has a top surface 31 and opposite side flanks 32 and 33, all of which are radially relieved from the face to the trailing gash 34. The top cutting edge 29 may be formed with any desired configuration, and preferably is straight except for slightly rounded corners at the ends. The cutting side edge 30 is substantially perpendicular to the hob axis so that the chamfering cut will produce a substantially flat surface 18 and thereby leave the land 19 with approximately parallel side edges.

In setting up the hob 15 for cutting operation, it is necessarily located to avoid interference and to sweep across the selected corners of the gear teeth 17 at an angle determined by the desired angle of chamfer. As shown in Figs. 4 to 6, the axes of the hob 15 and gear 16 are located in parallel planes, and relatively inclined at approximately 45° which is the preferred angle of chamfer, and the hob is located to one side of the vertical center line 35 of the gear at such a distance that the approaching side flank of each gear tooth 17 at the time the chamfering cut is completed will be medially disposed perpendicularly to the hob axis (see Figs. 5 and 11) as indicated by the line 36. Obviously the distance $d$ between the lines 35 and 36 will vary for different gear pressure angles. The hob 15 is set at a distance between axes sufficient when fed to normal depth to chamfer the full height of the gear teeth, and, in the full sweep of the hob teeth, will actually form a notch 37 inside the base circle of the gear 16. Preferably, the hob 15 and gear 16 are so rotated that the hob teeth will emerge from the end surfaces of the gear teeth 17 so as to avoid the formation of burrs on the flanks of the gear teeth.

In prior chamfering hobs of the multiple thread type, a comparatively few teeth of each convolution and extending over only a small portion, considerably less than half, of the circumference, can be utilized for cutting purposes, the remaining teeth being out of cutting range and therefore ineffective. As a result, the few effective teeth are insufficient in number to completely chamfer a large gear in one gear revolution, and are subjected to a heavy cutting load. Also, the cutting action is interrupted in proceeding from each gear tooth to the next, thus resulting in a sharp and noisy impact at the start of each cut, and attendant chatter and vibration. These conditions impair the hob life, are deleterious to the machine structure, and produce a poor work finish.

One of the primary objects of the present invention is to avoid the foregoing difficulties by forming and arranging the hob teeth of the two threads so that as the final tooth of either convolution is finishing its cut, the leading effective tooth of the other convolution will be starting its cut on the next gear tooth. To this end, the successive teeth of the two convolutions are arranged side by side in a circumferential series of pairs, but 180° out of phase, so that the leading cutting tooth 7 of the thread 26 will be paired with the final tooth 14a of the thread 27, and the leading tooth 7a of the thread 27 will be paired with the final tooth 14 of the thread 26, etc. In order to obtain the desired tooth height so that the initial cutting tooth 7 or 7a of the trailing convolution at any given time will project into the cutting zone, and that at the same time objectionable interference will be avoided, the cutting teeth of each convolution are reduced progressively in height from the leading to the final tooth. Consequently, the final tooth 14 or 14a will be considerably shorter than the leading tooth 7a or 7, but due to the relative approaching curvature of the gear 16, will nevertheless cut the ultimate form to the desired depth, as clearly illustrated in Fig. 11. Thus, the actual cutting teeth of each convolution can be increased in number, and extend in series substantially entirely over one-half of the circumference so as to distribute the cutting load most effectively. Under the foregoing arrangement, the leading teeth 1 to 6 and 1a to 6a are ineffective, and are left on the hob and made uniform in height only in order to retain good balance and appearance, and for convenience in manufacturing.

To provide adequate side clearance $c$ for each hob tooth 25, the teeth are bodily inclined about the medial radial center lines of their respective faces 28 out of the thread helix so that the side flanks 32 which sweep the areas being chamfered are disposed with little or no spiral lead and may be actually located in a transaxial plane of the hob. This reduction in side clearance of the flanks 32 still leaves adequate clearance for the opposite flanks 33 because of the angular disposition of the hob axis relative to that of the work, and the progressive rotation of the work.

In operation, and assuming that the hob 15 and the gear blank 16 have been set in proper starting position, both are rotated in timed relation in the directions indicated by the arrows in Figs. 4, 5 and 6. The hob lead $l$ is such in relation to the circular pitch of the gear that the two thread convolutions will act successively on consecutive gear teeth.

Figure 9:
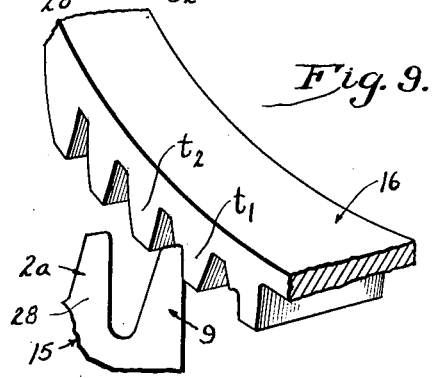
Figure 10:
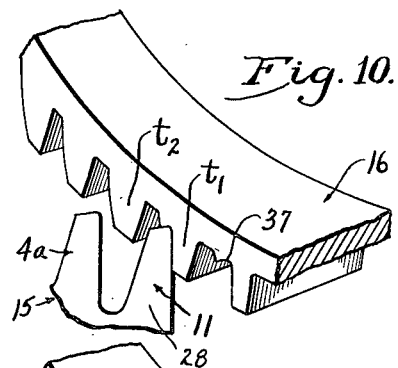
Figure 11:
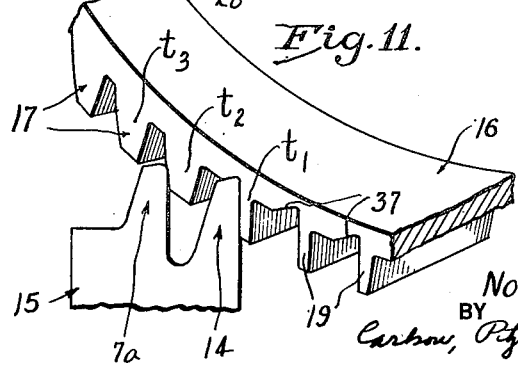

Initially, the hob is relatively advanced axially of the work into full depth position. In the continued rotation of the hob 15 and the gear blank 16, the leading effective cutting tooth 7 of the tooth row or thread 26 will start cutting the gear tooth $t_1$, as shown in Fig. 8. Thereafter, the teeth 8 to 14 will take successive cuts to complete the chamfered surface 18 on the tooth $t_1$, Figs. 9, 10 and 11 showing the teeth 9, 11 and 14 completing their respective cuts. During the cutting action of the hob teeth 9 to 13 on the gear tooth $t_1$, the tooth row or thread 27 is ineffective, since the normally effective teeth thereof are out of cutting range, as illustrated by the positions of the teeth 2a and 4a in Figs. 9 and 10. However, as the final tooth 14 of the thread 26 takes the last cut on the tooth $a_1$, the leading cutting tooth 7a of the thread 27 moves into position to take the initial cut on the succeeding gear tooth $t_2$, this relationship having been brought about by the progressive rotation of the hob 15 and the gear blank 16, and being made possible by the relatively increased height of the leading tooth. Then the teeth 8a to 14a complete the chamfer on the tooth $t_2$, while the tooth thread 26 is ineffective until, during the final cut by the tooth 14a, the leading tooth 7 of the thread 26 starts to chamfer the gear tooth $t_3$. It will be evident that the gear blank 16 is rotated through the distance of two gear teeth for each complete revolution of the hob 15, and that the two threads 26 and 27 are effective alternately and without interruption of the cutting action to chamfer two teeth per hob revolution. The foregoing operation is continued until all of the gear teeth have been chamfered during the course of one complete gear revolution, plus a slight additional rotation to finish the teeth which are partially cut during the initial infeed of the hob to full cutting depth.

I claim as my invention:

1. A gear chamfering hob adapted for forming on gear teeth chamfered surfaces inclined relative to the longitudinal axes of the teeth, said hob comprising a rotary body of generally annular configuration and having a plurality of rows of similarly shaped, radially relieved hob teeth helically positioned on the peripheral surface of said hob, all of said teeth having the same general cutting contour, said rows of teeth starting substantially at uniformly peripherally spaced points about the body in a common transaxial plane, and each row comprising a series of effective cutting teeth extending over a portion of the circumference of the body, the sets of effective teeth of the rows being stepped peripherally to cut successively but collectively in a continuous sequence throughout each hob revolution, the leading cutting tooth of each row being paired with the final tooth of the other row, the effective cutting teeth of each row decreasing in radial height progressively from the leading tooth to the final tooth, said hob thus being adapted to form finished chamfered surfaces upon two successive teeth upon each revolution of the hob.

2. A gear chamfering hob adapted for chamfering the ends of gear teeth to form lands thereon of less width than the width of the respective teeth, said hob comprising a rotary body having two rows of radially relieved hob teeth helically positioned on the peripheral surface, said rows of teeth starting at diametrically opposite points in a common transaxial plane and each extending through a full convolution, one row comprising a series of ineffective leading teeth and a following series of effective cutting teeth extending through at least one-half portion of the circumference of the body, and the other row comprising a series of ineffective leading teeth and a following series of effective cutting teeth extending through at least the other half portion of the circumference, the teeth of the rows being arranged side by side in a peripheral succession of pairs, the effective cutting teeth of each row decreasing in radial height progressively from the leading tooth to the final tooth, the leading cutting tooth of each row being paired with the final tooth of the other row, all effective teeth having the same cutting contour each with an end cutting edge and one side cutting edge disposed substantially perpendicular to the hob axis, said side cutting edges of the respective teeth being adapted to shape the final configuration of the chamfered surfaces on the gear teeth.

NORMAN C. REMICH.

REFERENCES CITED

The following references are of record in the file of this patent:

UNITED STATES PATENTS

| Number | Name | Date |
|---|---|---|
| 1,329,806 | Schurr | Feb. 3, 1920 |
| 1,648,470 | Anderson | Nov. 8, 1927 |
| 1,707,105 | Wheatly | Mar. 26, 1929 |
| 1,765,853 | Simmons | June 24, 1930 |
| 1,928,646 | Edgar | Oct. 3, 1933 |
| 2,049,492 | Drader et al. | Aug. 4, 1936 |
| 2,164,643 | Drader | July 4, 1939 |
| 2,414,790 | Barnard et al. | Jan. 28, 1947 |
| 2,491,720 | Frei | Dec. 20, 1949 |

FOREIGN PATENTS

| Number | Country | Date |
|---|---|---|
| 18,413 | Great Britain | Sept. 21, 1911 |